May 2, 1939. F. P. MILLER Re. 21,068

ROTARY CUTTER

Original Filed May 16, 1925

Inventor
FRANK P. MILLER

By E. F. Salter

Attorney

Reissued May 2, 1939

Re. 21,068

UNITED STATES PATENT OFFICE 21,068

ROTARY CUTTER

Frank P. Miller, Meadville, Pa.

Original No. 1,681,675, dated August 21, 1928, Serial No. 30,782, May 16, 1925. Application for reissue December 1, 1938, Serial No. 243,440

8 Claims. (Cl. 29—105)

This invention relates to rotary cutters such as milling cutters, reamers, tool holders for lathes, counterbores and the like, and has for an important object the provision of simple and easily adjusted means for holding the blades rigidly in place during the use of the same.

More specifically, the invention forming the subject of this application aims to provide a rotary cutter in which the blades are securely held against endwise and edgewise shifting by the simple adjustment of a set screw for each blade, the set screw being at all times accessible for engagement by a screw-driver or other tool.

Other objects and advantages will be apparent during the course of the following description.

In the accompanying drawing forming a part of this application and in which like numerals are employed to designate like parts throughout the same, Figure 1 is a fragmentary perspective of a milling cutter embodying the invention;

Figure 1:
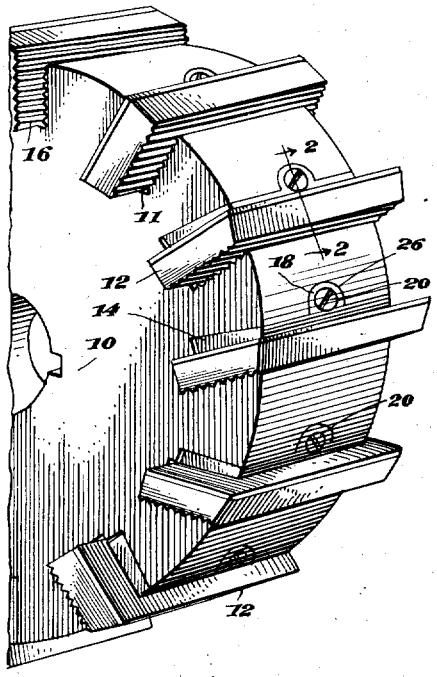

In the drawing wherein for the purpose of illustration is shown a preferred embodiment of the invention the numeral 10 designates a milling cutter body provided with an annular series of slots 11 for the reception of blades 12 and wedge blocks 14. Figure 1 plainly illustrates that one side face of each blade 12 and the adjacent wall of the groove or slot 11 is provided with angularly extending, interfitting teeth or serrations 16.

Figure 3:
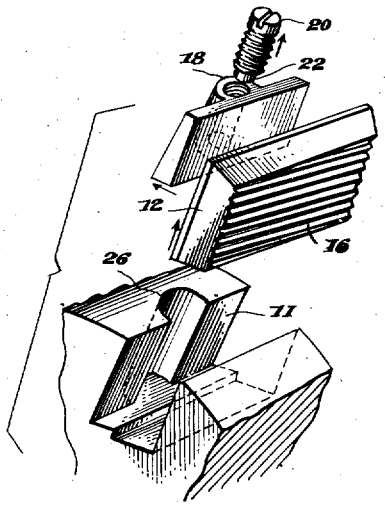
Figure 3 is a group perspective illustrating a blade and the holding means therefor.

Attention is directed to Figures 1 and 3 which illustrate that the tapered wedge block 14 is provided intermediate the ends thereof with a transverse rib or boss 18 interiorly threaded for the reception of an adjusting screw 20. The adjusting screw 20 is provided at the inner end thereof with a reduced contact portion 22 which bears against the inner end wall of a groove 26 and thereby forces the tapered wedge block 14 outwardly into binding engagement with the blade. It will be seen that when the tapered wedge block 14 is forced outwardly by the turning of the screw 20 the serrations 16 will be securely interlocked with each other so that the blade is positively held against endwise and edgewise movement.

It will be seen that the block 14 is held against endwise movement by the boss 18 which is snugly received in the groove 26 in one side wall of the slot. This also greatly expedites the assembling of the cutter as well as holding the block against endwise movement during the use of the cutter.

Figure 2:
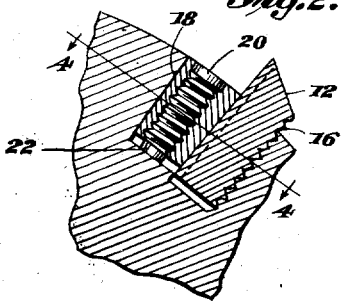
Figure 2 is a detail vertical sectional view through the same.
Figure 4:
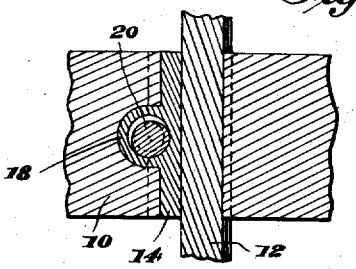
Figure 4 is a detail sectional view taken on line 4—4 of Figure 2.

Figure 2 illustrates that the set screw 20 exerts a thrust substantially parallel to the blade 12 and consequently the wedge 14 may have flat engagement throughout with the opposed side of the blade 12. In other words, uniform pressure contact between the wedge and the blade results from the tightening of the set screw 20.

Figure 5:
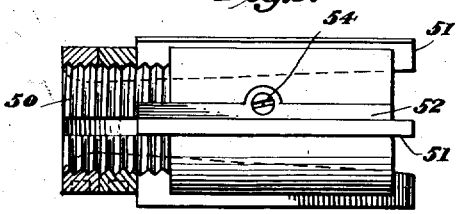
Figure 5 is a side elevation of a reamer embodying the invention.

Figure 5 illustrates the invention carried out in connection with a reamer, the body 50 of which is slotted for the reception of blades 51. The wedge blocks 52, which may be of any length, are forced outwardly into binding engagement with the blades 51 by the set screws 54 in the manner described in connection with the milling cutter.

In summarizing, it will be seen that the invention contemplates a body or holder having a slot in which the blade 12 and wedge 14 are positioned and that the wedge 14 is increased in width toward the inner edge thereof and bears directly against one side of the blade, preferably the front side, so that the thrust of the substantially radial adjusting screw 20 will force the wedge 14 outwardly into uniform pressure contact with the blade whereby the blade is firmly held in place. The angle of the interfitting serrations 16 on the trailing side of the blade and the rear wall of the slot is such that the serrations do not lie parallel to the direction of travel of the wedge as it moves out radially under action of the fastener 20, thus serving to hold the blade against outward radial movement with the wedge.

The invention is capable of a variety of mechanical expressions and it is therefore to be understood that the form of invention herewith shown and described is to be taken merely as a preferred example of the same and that such minor changes as will remain within the spirit of the invention and the scope of what is claimed may be made.

Having thus described the invention, what is claimed is:

1. A cutter comprising a body having a slot, a blade and a wedge in the slot and having the opposed sides thereof flatly in contact, the wedge being provided with a boss, and a screw threaded through the boss substantially parallel to the plane of the blade and engaging the bottom wall of the slot to urge the wedge outwardly whereby one side of the wedge is flatly in binding engagement throughout with the opposed side of the blade.

2. A cutter comprising a body having a slot, a blade and a wedge in the slot and having the opposed sides thereof flatly in contact, the wedge being provided between the ends thereof with a transverse boss, and an adjusting screw threaded through the boss substantially parallel to the plane of the blade and engaging the bottom wall of the slot to urge the wedge outwardly whereby one surface of the same has uniform pressure contact with the opposed side of said blade, one side of said slot being grooved to snugly receive said boss.

3. A cutter comprising a body having a slot, a blade in said slot, a wedge in the slot in direct contact with the front side of the blade, an adjusting screw in threaded engagement with the wedge and bearing against the slot bottom to urge the wedge outwardly into binding engagement with the front side of the blade, the position and thrust of said screw being substantially parallel to the plane of said blade, and a plurality of interfitting serrations on the rear side of said blade and the rear wall of said slot, said serrations being angled with respect to the direction of travel of said wedge so as to hold the blade against outward radial movement with the wedge.

4. A cutter comprising a body having a slot, a blade in said slot, a wedge in the slot in direct contact with one side of the blade, an adjusting screw in threaded engagement with the wedge and bearing against the slot bottom to urge the wedge outwardly into binding engagement with the blade, and a plurality of interfitting serrations on the other side of said blade and the opposed wall of said slot, said serrations being out of parallelism with the direction of travel of the wedge under the action of said screw.

5. A cutter comprising a body having a slot, a blade in said slot, a wedge in the slot in direct contact with one side of the blade, an adjusting screw in threaded engagement with the wedge and bearing against the slot bottom to urge the wedge outwardly into binding engagement with the blade, a plurality of interfitting serrations on the other side of the blade and the opposed wall of the slot at an angle to the radial cutting thrust of the blade, and the blade having a step-by-step radial adjustment by means of said serrations whereby the inward radial cutting thrust of the blade is taken by said serrations with the bottom of the blade spaced from the bottom of the slot.

6. A cutter comprising a body having a slot, a blade in the slot, a wedge in the slot in direct contact with the front side of the blade, and an adjusting screw having threaded engagement with the wedge and bearing against the bottom wall of the slot to urge the wedge outwardly into binding engagement with the blade, the rear side of said blade and the rear wall of said slot being provided with a plurality of interfitting serrations angled with respect to the direction of travel of the wedge under the action of said screw.

7. A cutter comprising a body having a slot, a blade in said slot, a wedge mounted in the body in direct contact with one side of the blade, an adjusting screw in threaded engagement with the wedge and bearing against the body below the wedge to urge the wedge outwardly into binding engagement with the blade, and a plurality of interfitting serrations on the other side of said blade and the opposed wall of said slot, said serrations being angled with respect to the direction of travel of the wedge under the action of said screw.

8. A cutter comprising a body having a slot, a blade in said slot, a wedge mounted in the body in direct contact with the front side of the blade, an adjusting screw in threaded engagement with the wedge and bearing against the body below the wedge to urge the wedge outwardly into binding engagement with the blade, the rear side of said blade and the rear wall of said slot being provided with a plurality of interfitting serrations angled with respect to the direction of travel of the wedge under the action of said screw.

FRANK P. MILLER.